United States Patent
Kiseljev et al.

(12) 
(10) Patent No.: US 6,230,681 B1
(45) Date of Patent: May 15, 2001

(54) ORBITAL ENGINE

(75) Inventors: Alexander Kiseljev; Eugenji Borisov, both of Vaduz (LI)

(73) Assignee: Planetarische Motoren AG (LI)

( * ) Notice: Subject to any disclaimer, the term of this patent is extended or adjusted under 35 U.S.C. 154(b) by 0 days.

(21) Appl. No.: 09/297,533

(22) PCT Filed: Oct. 31, 1997

(86) PCT No.: PCT/EP97/06026

§ 371 Date: Jul. 2, 1999

§ 102(e) Date: Jul. 2, 1999

(87) PCT Pub. No.: WO98/19060

PCT Pub. Date: May 7, 1998

(30) Foreign Application Priority Data

Oct. 31, 1996 (RU) .................................. 96121281

(51) Int. Cl.⁷ .................................................. F02B 53/00
(52) U.S. Cl. ........................................... 123/221; 418/207
(58) Field of Search ............................ 123/221; 418/207

(56) References Cited

U.S. PATENT DOCUMENTS

| 3,809,022 | 5/1974 | Dean, Jr. . |
| 5,293,849 | 3/1994 | Huckert . |

FOREIGN PATENT DOCUMENTS

| 0 091 975 | 10/1983 | (EP) . | |
| 365 105 | 9/1906 | (FR) . | |
| 1560730 | * 4/1990 | (SU) | ................................. 418/207 |
| 1772375 | * 10/1992 | (SU) | ................................. 418/207 |
| 91 14859 | 10/1991 | (WO) . | |

* cited by examiner

Primary Examiner—Michael Koczo
(74) Attorney, Agent, or Firm—Robert W. Becker & Associates

(57) ABSTRACT

A rotor-piston internal combustion engine comprised of a body with two intersecting circular cylinders with pistons therein, two diametrically located ignition chambers and two cylindrical cavities, driving shaft and piston synchro mechanism with two hinges is provided.

7 Claims, 4 Drawing Sheets

ORBITAL ENGINE

BACKGROUND OF THE INVENTION

The present invention relates to engine-building industry and may be used in transportation industry.

From Inventor Certificate SU-81 474 a rotor-reciprocating combustion engine is known containing a body including two intersecting circular cylinders, two diameter opposite combustion chambers and two input/output channels, one pair of each per cylinder, a driving shaft, a piston shaft and a tooth gearing synchro system connecting the driving shaft with pistons.

The deficiency of this known device is its low reliability, too high mass/volume parameters, noncompactness, complication of design and maintenance, and a large number of elements which altogether prevents the pistons from being synchronized fully with each other.

Further from RU-A-1 772 372, it is known to provide a rotor-combustion engine with two intersecting circular cylinders with pistons inside, two diameter opposite input/output or inlet/outlet chambers, one pair of each per cylinder, a driving shaft and a synchro system consisting of two hinges each having a cylinder cam and a disk with a through hole, the axis thereof being perpendicular to the longitudinal axis of the cylinder, the body having a spherical cavity and two through diameter channels with conical sections, the driving shaft having a central spherical part, two opposite conical and two cylinder parts attended by corresponding sections of a body cavity. In the central sphere part of the driving shaft, there is a through slot tilted to the shaft axis and being perpendicular to the through hole containing the cylinder cam.

The deficiency of design of this known rotor-piston combustion engine is insufficient effectiveness or transforming mechanism.

The object of the present invention is to provide a combustion engine according to the opening portion of claim 1 which has an improved specific power, rotation moment, engine economy and balance of mechanism.

SUMMARY OF THE INVENTION

This object is achieved by claim 1. Advantageous developments may be taken from the subclaims.

The invention provides a rotor-piston combustion engine containing two intersecting cylinders with pistons, two diametrically located ignition chambers and two inlet/outlet chambers, each pair per cylinder, a drive shaft, a piston synchro system consisting of two arcuate coupling devices, preferably hinges, each having a cylinder pin and disk, the body of the engine having a sphere cavity (central spherical cavity) and two through diameter channels (two cylindrical portions positioned diametrically opposite one another) with conical and two cylinder sections attended by corresponding sections of the body cavity.

The through slot (slot) in the central sphere section (spherical center portion) of the driving shaft is tilted to the shaft axis, through hole is perpendicular to the slot containing the cylinder cam. Additional arc pistons in intersecting two circular cylinders and corresponding two hinges and two additional slots are inclined to the longitudinal axis of the driving shaft, and are located symmetrically to each other in the central sphere section of the driving shaft, with the input/output windows being located on side walls of the circular cylinders.

The two pistons of the engine according to the invention are equivalent to eight pistons in a conventional combustion engine. The inventive engine has a very low vibration level due to excellent balancing since rotating masses are always in symmetrical position around the shaft, resulting in a twisting movement.

The engine according to the invention has a low revolution per minute for the same power. A free-wheel is unnecessary in view of the very smooth rotation of four strokes per revolution and since there are no dead centers at all.

Moreover, the shaft may be of very convenient and easy construction without requiring a crankshaft. The shaft is smoothly energized since no peak torque close to dead centers arises.

Same as with two-stroke engines, no valves, and thus, no camshaft is required.

The inventive engine requires only a very limited number of components which are all of very simple construction and easy to assemble. Thus, the manufacturing cost is low.

No piston rings are required, and no calibration and trimming since no valve and no camshaft exist. Due to the light construction, even with conventional materials a high power/weight ratio may be obtained. Moreover, there are only low idling turns, and the engine starts easily. Because of the improved carnot cycle, the thermodynamics are better, increasing the coefficient of filling to close to one. Thus, less pollution and less consumption and higher efficiency arises.

Typically, the maximum speed is about 2000 rpm such that the friction which is lower at lower speed is reduced, too.

Further details and advantages as well as features may be taken from the following detailed description of one embodiment of the invention with respect to the drawing.

DESCRIPTION OF PREFERRED EMBODIMENTS

Figure 1:
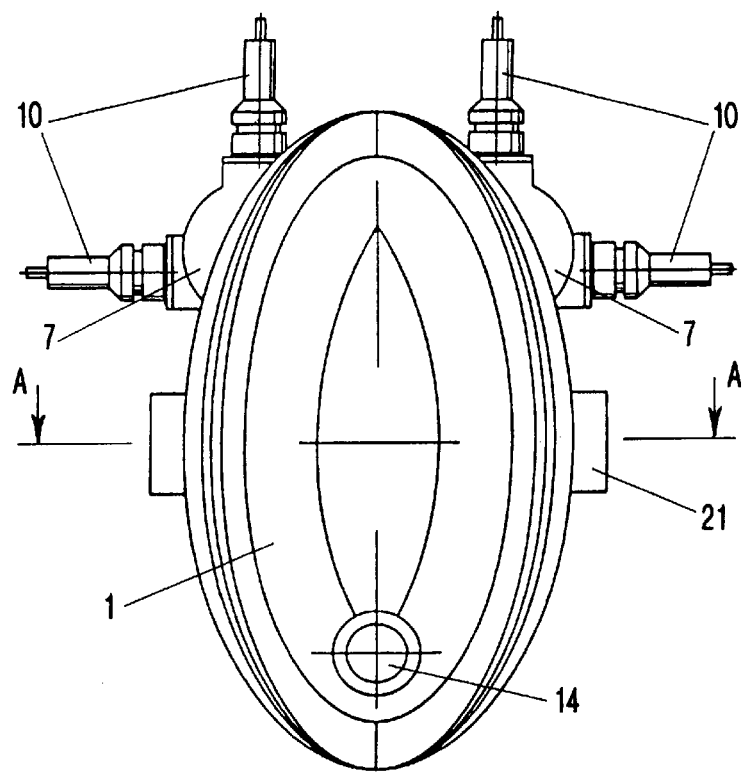
FIG. 1 a side view of an embodiment of the engine according to the invention.

The engine shown in FIG. 1 consists of a detachable body 1 (FIGS. 1,2) of four parts connected by bolts. Body 1 has two circular cylinders being sector cut in cross-section, the lower base of which being turned towards center. Connectors 3 (FIG. 2) are oriented relative to the axis of circular cylinders 2. The surface passing through points of intersection of the driving shaft and circular cylinders 2 divides circular intersecting cylinders, on one side of surface, into cool cavity BDE (FIGS. 7,8) where input/output strokes are in turn, and hot cavity CFA with the strokes of working movements and output of used gases.

In the center of engine body 1 there is a driving shaft cavity with central sphere surface (central spherical cavity)

Figure 3:
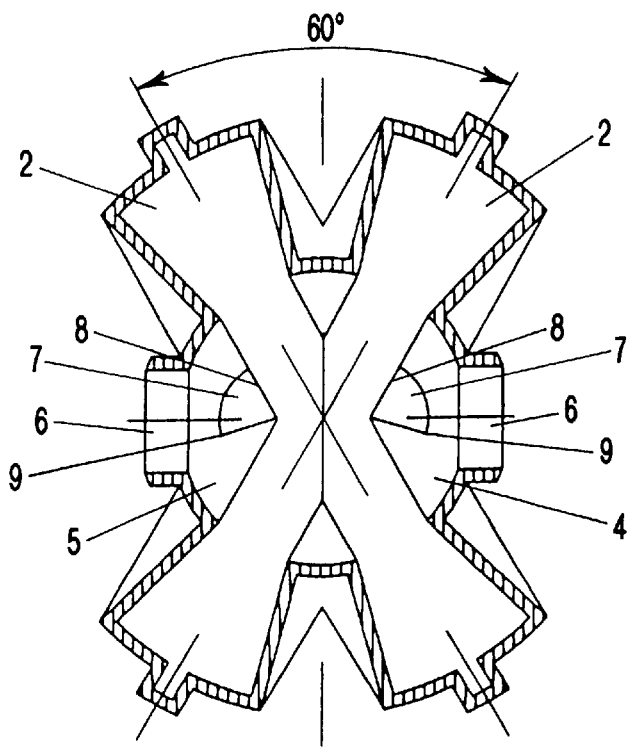
FIG. 3 a transversal section of the engine body (upper part)

5 (FIG. 3) and two diametrically opposite cylinder sections 6. On central sphere surface 5, there are two cavities 7 (FIG. 3) for combustion chambers each having one opening window 8 corresponding to hot zones. Edge 9 of side wall of the chamber has a tilt of 22 to 23° to the longitudinal axis of cavity 4 (FIG. 3).

Figure 2:
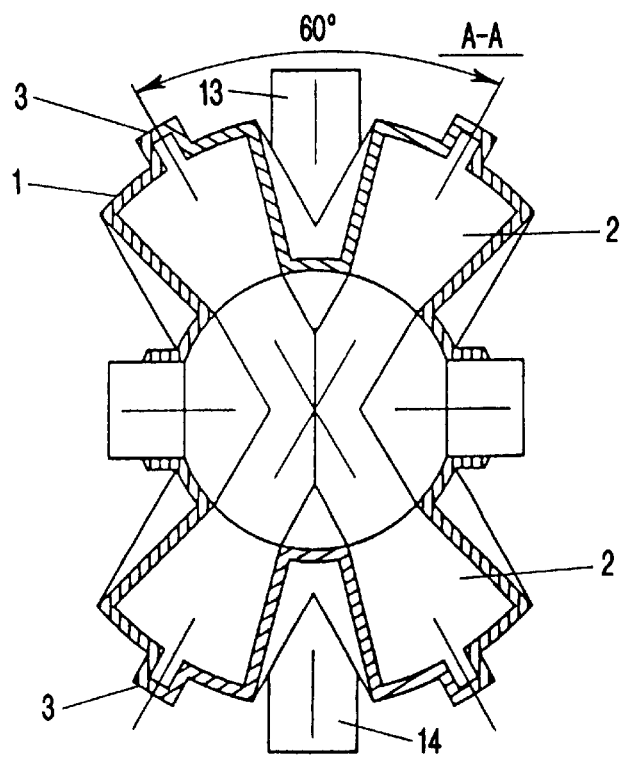
FIG. 2 a transversal section of-the engine body (lower part)
Figure 4:
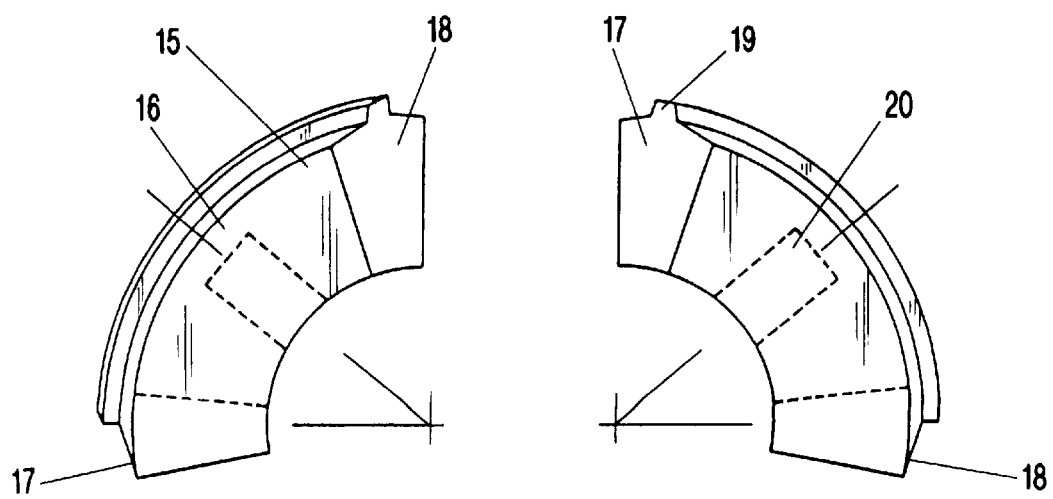
FIG. 4 engine pistons for the engine according to FIG. 1.
Figure 6:
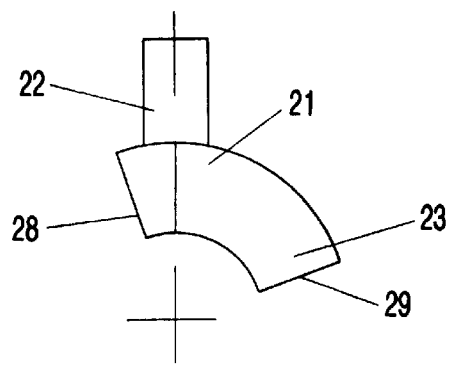
FIG. 6 synchro mechanism hinges for the pistons according to FIG. 4.

Over or above the chamber there are ignition plugs 10 (FIG. 1). Input opening 11 and output opening 12 (FIGS. 2, 7, 8) are pairly connected with input chamber 13 and output chamber 14 (FIGS. 1,2). In the circular intersecting cylinders there are four arc pistons 15 (FIG. 4) with cross-section matching the cross-section of circular intersecting cylinders. Arc pistons have side 16 and end 17,18 surfaces. On outer sphere surface there is for each one a longitudinal driving clamp, and there is one non-through cylinder hole (receiving bore) 20 for a hinge cam 21 (hinge/arcuate coupling device 21) (FIG. 6) which consists of cylinder cam 22 (pin) and disk 23.

A driving shaft 24 (FIG. 5) has a central spherical surface 25 and two opposite cylinder sections 26 attended by or adjacent to the inner surface of the cavity 4 (FIG. 2).

Figure 5A:
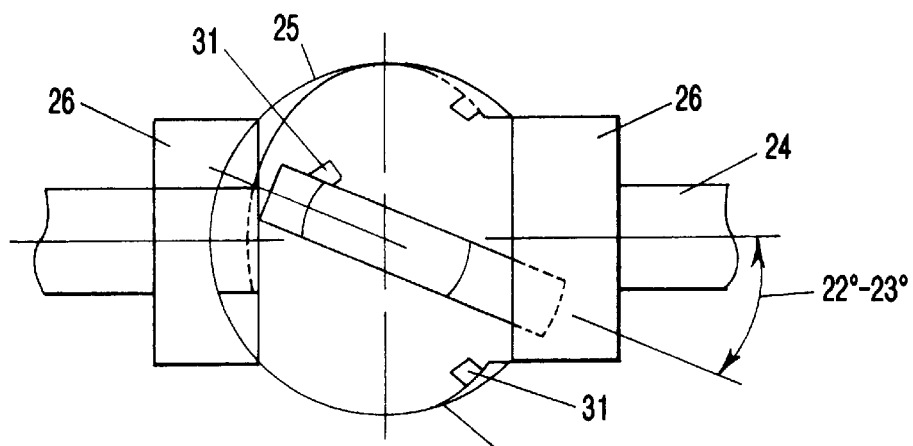
FIGS. 5a and 5b a driving shaft for the engine according to FIG. 1.
Figure 5B:
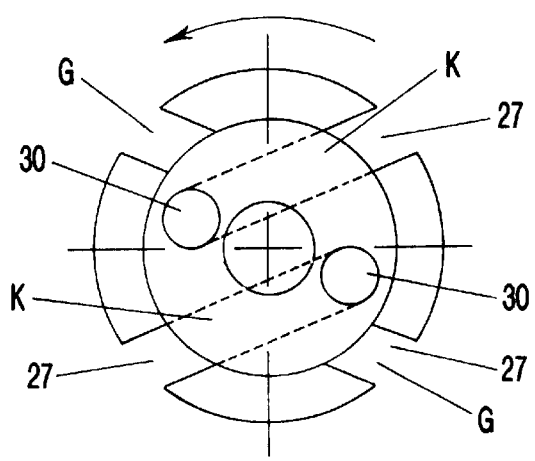

On the sphere surface of the driving shaft 24 there are four inclined slots 27 (FIG. 5) arranged at an angle of 22 to 23° to the longitudinal axis of the driving shaft and to each other. In the slots, there are disks 23 of the four hinges 21 (FIG. 6) dividing the slots cavities into two cavities G, K. Cavity G faces the, end 28 of sector 23 of hinge 21 is part of combustion chamber 7 volume (FIG. 3), and cavity G faces the side of end 29 of disk 23. The hinge 21 has an oil cavity which has one window 30 for each end cylinder section 26 of the driving shaft 24 (FIG. 5b).

On the spherical surface of the driving shaft on both surfaces there are four holes 31 (FIG. 5a) with the interval of 90° in between.

Operation of device is as follows:

During interaction of the four arc pistons 15 (FIGS. 4,7,8) inside the two intersecting circular cylinders 2 (FIGS. 2,3) between end 17,18 and side 16 surfaces of the arc pistons, there appear six cavities A,B,C,D,E,F which are changing in volume and corresponding to repeating processes: input, compression, working movements and output of used gases. This results in four 4 stroked cycles per one rotation of the driving shaft.

The engine is suitable for gas, diesel and petrol depending only on the desired application.

During one turn of the driving shaft in the process of revolution of the arc pistons inside the two intersecting circular cylinders the disks 23 of the four hinges 21 (FIG. 6) make a forth/back movement inside the inclined slots 27 of the driving shaft 24 (FIG. 5). In cavity G, there are in turn input and compression of fuel mixture and in cavities K there are pumping and input of oil through the openings 30 (FIG. 5), thus lubricating any fricting parts and cooling the driving shaft. Input of fuel is under the action of the arc piston 15 (FIG. 5) and sector 23 of hinge 21 (FIG. 6) through the input opening (FIG. 7,8) simultaneously.

The compression stroke starts in cavity B (FIG. 7) after the arc piston closes the input opening for a duration of 130° of turn of the arc piston together with disk 23 of hinge 21 in cavity G of driving shaft 24 (FIG. 5). 40° before the end of the compressing stroke while the edge of the inclined slot 27 of the cavity G of the driving shaft is with the inclined edge 9 of the sidewall of chamber 7 (FIG. 3), fuel under excess pressure is moving into the combustion chamber where the final pressure is reached.

The full usage of fuel is supported by cavity 31 (FIG. 5) of driving shaft. Work stroke starts in cavity C (FIGS. 3,7) after ignition of fuel inside chamber 7 and in cavity G of the inclined slot 27 of the driving shaft 24. Under the ignition pressure gases from the chamber are moving through opening 8 (FIG. 3) into the working cavity and are acting onto end surface 18 of arc piston 15 (FIG. 4) which through hinge 21 (FIG. 6) rotates driving shaft 24 (FIG. 5a).

With the beginning of the working stroke the volume of the cavity G is entirely spaced with end 28 of disk 23 of hinge 21 (FIG. 6) during 50° of rotation the indicator pressure being raised.

Figure 7:
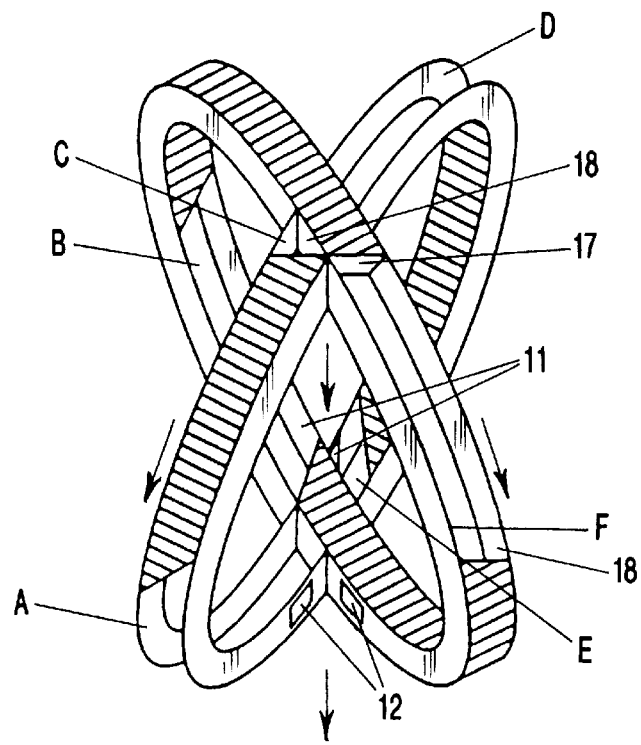
FIGS. 7,8 a principal diagram of engine operation in the beginning and the end of the working process.
Figure 8:
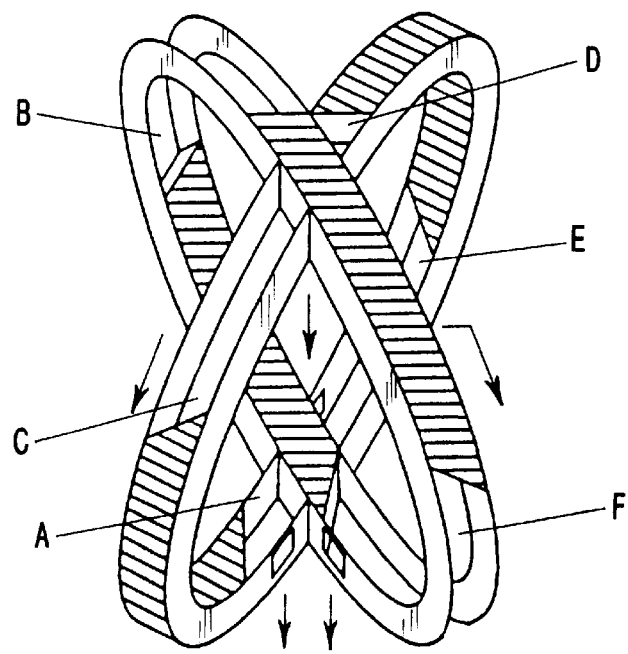

Working stroke is every 90° rotation of the piston together with a driving shaft rotation of 140°, without fall of rotation moment on driving shaft. Out of 140° gases act on end surface 18 of stroke 15 for 90° while the residual 50° are for acting of gases onto end surface 17 of stroke 15 (FIG. 7) during the reverse rotation of the driving shaft, the square of this surface is increasing whilst divergence of the arc pistons to that value of the surface 18 of the arc piston 15 (FIG. 7). After this, the arc piston opens side opening 12 (FIG. 8). This time, the rotation of driving shaft is due to the difference in surface of the ends or arc pistons resulting in gases acting simultaneously onto end surfaces 18 of the two pistons 15 in two work cavities C,F (FIG. 7), thus raising the driving shaft rotation moment and smoothness of the work of the engine.

The outlet of used gases is out of cavity A (FIG. 8) under the action of arc pistons 15 (FIG. 4) through outlet opening 12 (FIG. 7).

Due to the double number of working cycles per one rotation of the driving shaft together with the pistons, the total volume of the working cavities is 1,5 compared to the known engine of same size. These preferencies enable to raise specific power, rotation moment, economy and balance of engine.

The specification incorporates by reference the disclosure of Russian priority document 96121281/06 of Oct. 31, 1996 and PCT/EP97/06026 of Oct. 31, 1997.

The present invention is, of course, in no way restricted to the specific disclosure of the specification and drawings, but also encompasses any modifications within the scope of the claims.

What is claimed:

1. A rotor-piston internal combustion engine comprising:
    a body, said body having two intersecting torus-like cavities forming intersecting circular cylinders and being positioned about and open towards a central spherical cavity, said body having two cylindrical cavities positioned opposite each other, said body further comprising two ignition chambers being positioned in the vicinity of said intersecting area of said intersecting circular cylinders;
    four arc-shaped pistons being provided within said intersecting circular cylinders, said arc-shaped pistons having end surfaces;
    two inlet openings and two outlet openings in walls of said circular cylinders positioned near said intersecting area of said intersecting circular cylinders;
    a drive shaft having a spherical center portion corresponding with and being received by said central spherical cavity of said body and further having two cylindrical portions positioned diametrically opposite one another and extending out of said spherical center portion and being received in said two cylindrical cavities, wherein said spherical center portion has four arcuated slots corresponding to said arc-shaped pistons, and wherein said slots are inclined at an angle relative to the longitudinal axis of said drive shaft;

arcuate coupling devices being provided in each of said arcuate slots and moving back and forth therein, wherein each of said arcuate coupling devices has a pin extending radially and being supported in a receiving bore of a corresponding one of said arc-shaped pistons for synchronizing a motion of said arc-shaped pistons within said intersecting circular cylinders and for transmitting said motion to said drive shaft.

2. A rotor-piston internal combustion engine according to claim 1, wherein said body further comprises inlet and outlet chambers which are cylindrical and are positioned pair-wise.

3. A rotor-piston internal combustion engine according to claim 1, wherein said arcuate coupling devices have a disk.

4. A rotor-piston internal combustion engine according to claim 1, wherein said two cylindrical cavities of said body have conical inner sections.

5. A rotor-piston internal combustion engine according to claim 3, wherein one of said pins is provided for each of two arc-shaped pistons and wherein two of said arcuate coupling devices are mounted into said two intersecting circular cylinders.

6. A rotor-piston internal combustion engine according to claim 1, wherein an outer contour of said arc-shaped pistons matches an inner contour of said circular intersecting cylinders.

7. A rotor-piston internal combustion engine according to claim 1, wherein said arcuated slots are inclined at an angle of 22° to 23° relative to the longitudinal axis of said drive shaft and relative to each other.

* * * * *